(12) United States Patent
Wang et al.

(10) Patent No.: US 12,465,140 B2
(45) Date of Patent: Nov. 11, 2025

(54) ASSEMBLY DEVICE FOR A TABLE

(71) Applicant: Hui-Chuan Liao, Oakland, CA (US)

(72) Inventors: Chun-Ti Wang, Taichung (TW);
Hui-Chuan Liao, Oakland, CA (US);
Meng-Fu Ji, Taichung (TW);
Ching-Hsuan Chiu, Taichung (TW)

(73) Assignee: Hui-Chuan Liao, Oakland, CA (US)

( * ) Notice: Subject to any disclaimer, the term of this patent is extended or adjusted under 35 U.S.C. 154(b) by 99 days.

(21) Appl. No.: 18/654,925

(22) Filed: May 3, 2024

(65) Prior Publication Data

US 2025/0338953 A1 Nov. 6, 2025

(51) Int. Cl.
*A47B 13/00* (2006.01)
*A47B 13/02* (2006.01)

(52) U.S. Cl.
CPC .......... *A47B 13/003* (2013.01); *A47B 13/021* (2013.01)

(58) Field of Classification Search
CPC ................ A47B 13/003; A47B 13/021; A47B 2013/006; A47B 2095/006
See application file for complete search history.

(56) References Cited

U.S. PATENT DOCUMENTS

| | | | | |
|---|---|---|---|---|
| 11,197,378 B2* | 12/2021 | Liu | .................... | H05K 13/0069 |
| 2005/0066862 A1* | 3/2005 | Choi | ........................ | A47B 3/06 |
| | | | | 108/155 |
| 2006/0278777 A1* | 12/2006 | Atkinson | ............. | A47B 13/021 |
| | | | | 248/188.4 |
| 2021/0330071 A1* | 10/2021 | Grabowski | .......... | A47B 13/003 |
| 2022/0142356 A1* | 5/2022 | Lu | ........................... | F16B 21/02 |
| 2022/0265053 A1* | 8/2022 | Putnam | ............... | A47B 13/003 |
| 2024/0130518 A1* | 4/2024 | Lin | ...................... | A47B 13/003 |
| 2025/0143446 A1* | 5/2025 | Tai | .......................... | A47B 3/06 |

FOREIGN PATENT DOCUMENTS

| | | | | | |
|---|---|---|---|---|---|
| JP | H056210 U | * | 1/1993 | ............. | F16B 12/44 |
| KR | 20210091878 A | * | 7/2021 | ............. | F16B 12/20 |
| KR | 20220095639 A | * | 7/2022 | ............. | A47B 95/00 |
| KR | 102835499 B1 | * | 7/2025 | ............. | F16B 2/185 |

* cited by examiner

*Primary Examiner* — Daniel J Rohrhoff
(74) *Attorney, Agent, or Firm* — RABIN & BERDO, P.C.

(57) ABSTRACT

An assembly device for a table is disposed between a table board and a mounting frame of a table. The table board has an assembling hole with a stepped face. The assembly device has an assembling mount and at least one engaging element. The assembling mount has a connecting portion and an engaging portion connected to the connecting portion and having at least one engaging hole aligning with the assembling hole. The at least one engaging element is detachably connected to the assembling mount, and extends into the at least one engaging hole via the assembling hole to abut against the engaging portion. The at least one engaging element has an elastic engaging segment abutted against the bottom side of the connecting portion and a head segment connected to the elastic engaging segment and mounted in the assembling hole to abut against the stepped face.

20 Claims, 12 Drawing Sheets

ASSEMBLY DEVICE FOR A TABLE

BACKGROUND OF THE INVENTION

1. Field of the Invention

The present invention relates to an assembly device, and more particularly to an assembly device for a table that can provide a simplified structure, and can facilitate ease in assembly and disassembly.

2. Description of Related Art

In order to be portable and flexibly used in various venues, a conventional table has a foldable and storage structure. The conventional table has a table board, a mounting frame, and multiple assembly devices. The assembly devices are mounted between the table board and the mounting frame to connect the table board with the mounting frame.

Each one of the assembly devices has an assembling mount, an engaging panel, and a twist-locking rod. The assembling mount is mounted between the table board and the mounting frame and has a body and an eccentric portion. The body is connected to an end of the mounting frame and abuts a bottom side of the table board. The eccentric portion is formed on and transversally protrudes from an external surface of the body, and has a through hole longitudinally formed through the eccentric portion. The engaging panel is embedded in the table board and has an engaging hole. The engaging hole aligns with the through hole of the eccentric portion when the body of the assembling mount abuts the table board. The twist-locking rod is inserted in the engaging hole of the engaging panel via the through hole of the eccentric portion of the assembling mount, and has a locking panel. The locking panel is disposed on an end of the twist-locking rod inserted in the engaging hole and presses against the engaging panel when the twist-locking rod is rotated relative to the eccentric portion and the engaging panel. Then the table board can be connected with the mounting frame by the twist-locking rod engaged between the assembling mount and the engaging panel. Furthermore, after assembling the table board and the mounting frame, the table board and the mounting frame can be disassembled by rotating the twist-locking rod to disengage the engaging panel to store and carry the table board and the mounting frame.

However, the assembly device of the conventional table can provide an assembling effect to the table board and the mounting frame. The eccentric portion of the assembling mount of the assembly device is protruded from the external surface of the body, and this may increase overall volume and weight of the assembling mount and may increase the inconvenience for users when storing and carrying the assembly device of the conventional table. In addition, the table board and the mounting frame of the conventional table are connected to each other by the locking panel of the twist-locking rod engaging with the engaging panel, and the engaging panel is embedded in the table board and this may increase the cost of using the assembly device of the conventional table, may increase the overall weight of the table board, and may also increase the burden of storing and carrying the conventional table.

Furthermore, the assembly device of the conventional table uses the twist-locking rod rotating relative to the engaging panel to engage or disengage the engaging panel that is embedded in the table board. When the table board is displaced or deflected relative to the mounting frame after assembling, this will affect the structural relationship between the twist-locking rod and the engaging panel disposed between the mounting frame and the table board and cannot rotate the twist-locking rod relative to the engaging panel easily to disassemble, and the conventional table cannot be assembled and disassembled easily and conveniently.

The assembly device for a table in accordance with the present invention mitigates or obviates the aforementioned problems.

SUMMARY OF THE INVENTION

The main objective of the present invention is to provide an assembly device for a table that can provide a simplified structure, and can facilitate ease in assembly and disassembly.

The assembly device for a table in accordance with the present invention is disposed between a table board and a mounting frame of a table. The table board has an assembling hole with a stepped face. The assembly device has an assembling mount and at least one engaging element. The assembling mount has a connecting portion and an engaging portion. The engaging portion is connected to the connecting portion and has at least one engaging hole formed through the engaging portion and aligning with the assembling hole. The at least one engaging element is detachably connected to the assembling mount, and extends into the at least one engaging hole via the assembling hole to abut against a bottom side of the engaging portion to hold the table board between the assembling mount and the at least one engaging element. The at least one engaging element has an elastic engaging segment abutted against the bottom side of the connecting portion and a head segment connected to the elastic engaging segment and mounted in the assembling hole to abut against the stepped face.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
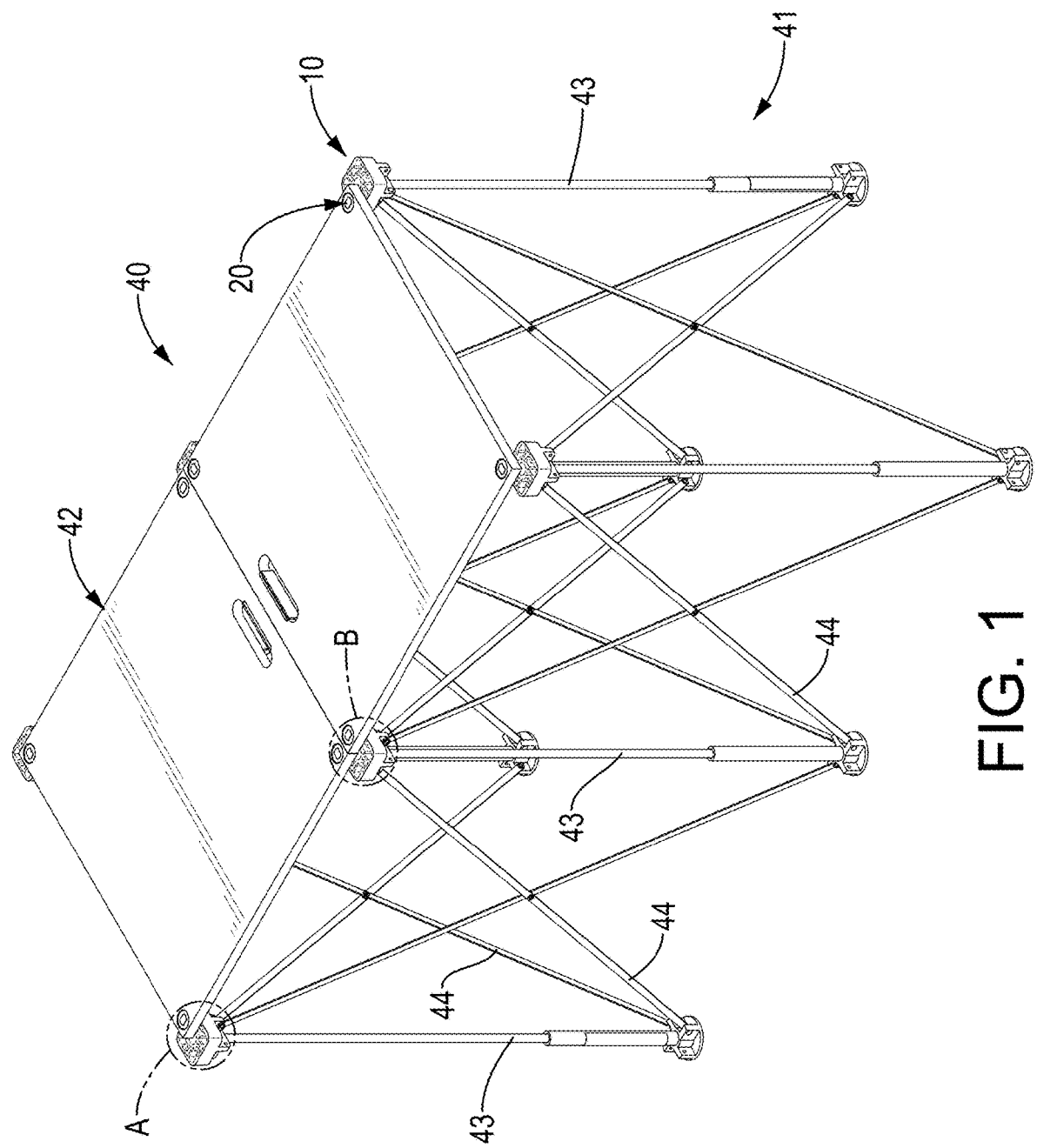
FIG. 1 is a top perspective view of an assembly device for a table in accordance with the present invention, disposed on a table.
Figure 2:
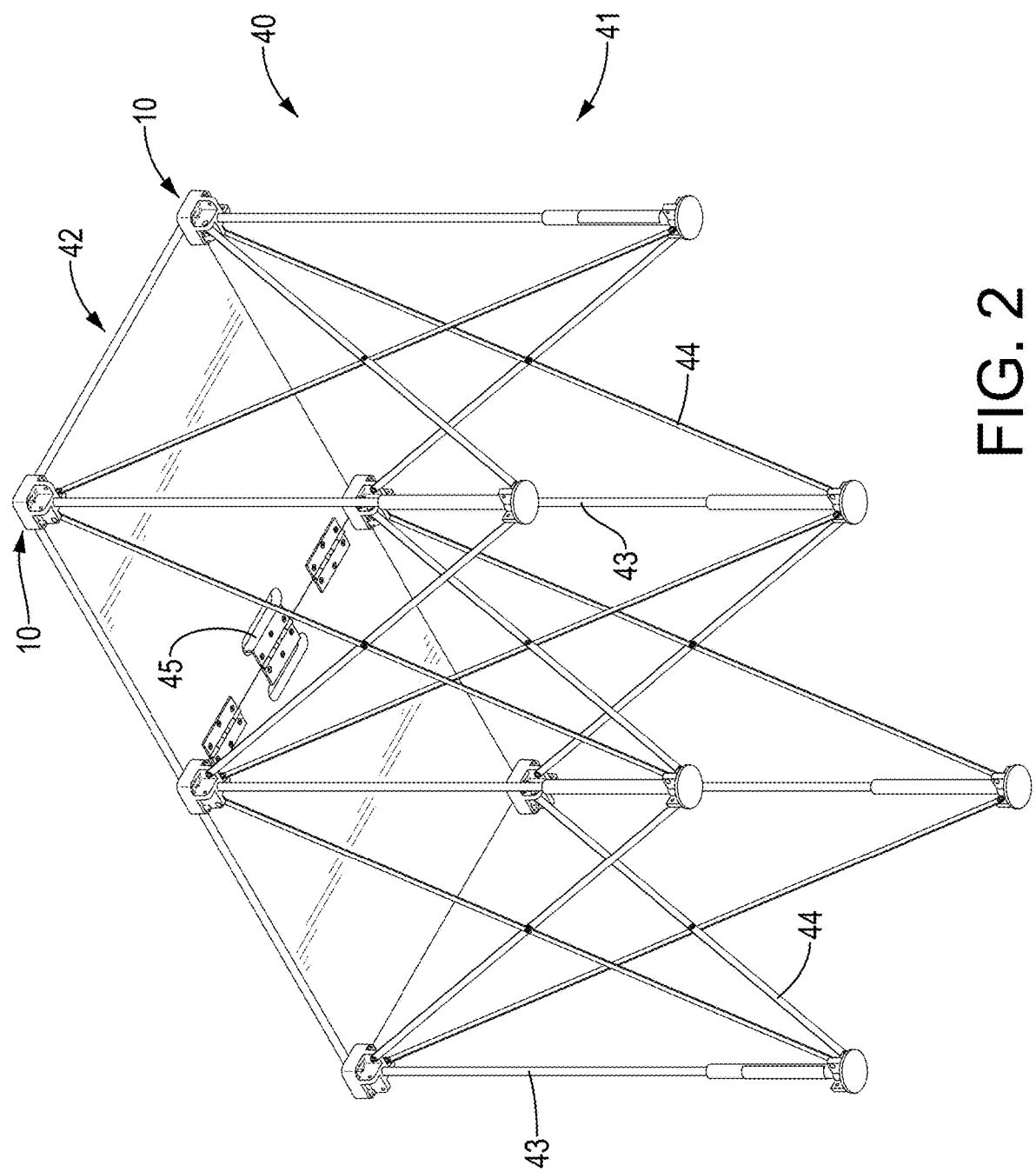
FIG. 2 is a bottom perspective view of the assembly device in FIG. 1.
Figure 3:
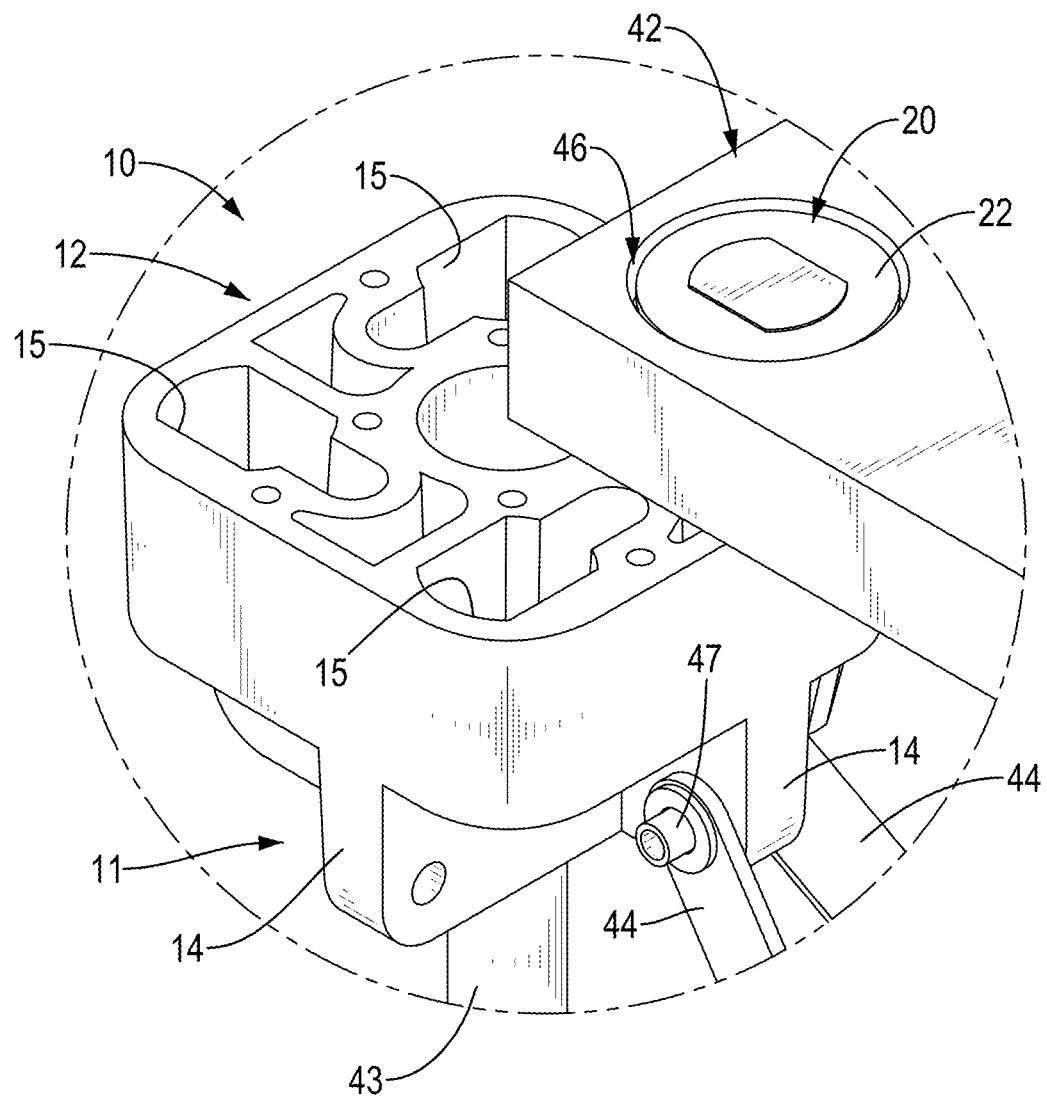
FIG. 3 is an enlarged perspective view of the assembly device at encircled A in FIG. 1.
Figure 4:
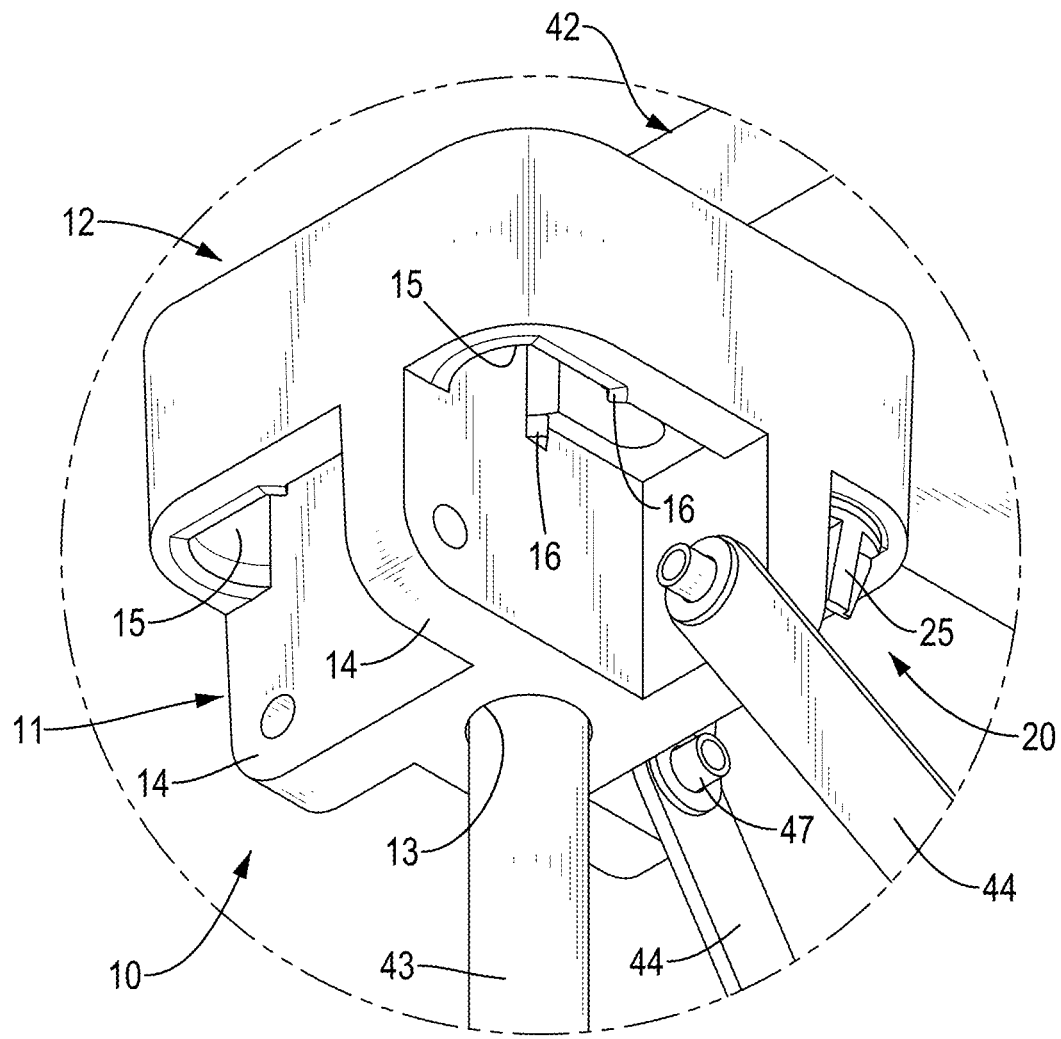
FIG. 4 is another enlarged perspective view of the assembly device at encircled A in FIG. 1.

With reference to FIGS. 1 to 4, an assembly device for a table in accordance with the present invention is connected to a table 40, and the table has a mounting frame 41 and a table board 42. The mounting frame 41 has multiple supporting legs 43 and multiple connecting shafts 44. Each one of the supporting legs 43 abuts the ground, and the connecting shafts 44 are pivotally connected to the supporting legs 43 alternately. The mounting frame 41 is configured to be foldable and expandable. The table board 42 is detachably disposed on the mounting frame 41 via the assembly device of the present invention, and has multiple hinges 45. With reference to FIG. 2, the hinges 45 are mounted on a bottom side of the table board 42, so that the table board 42 can be folded and unfolded.

Figure 5:
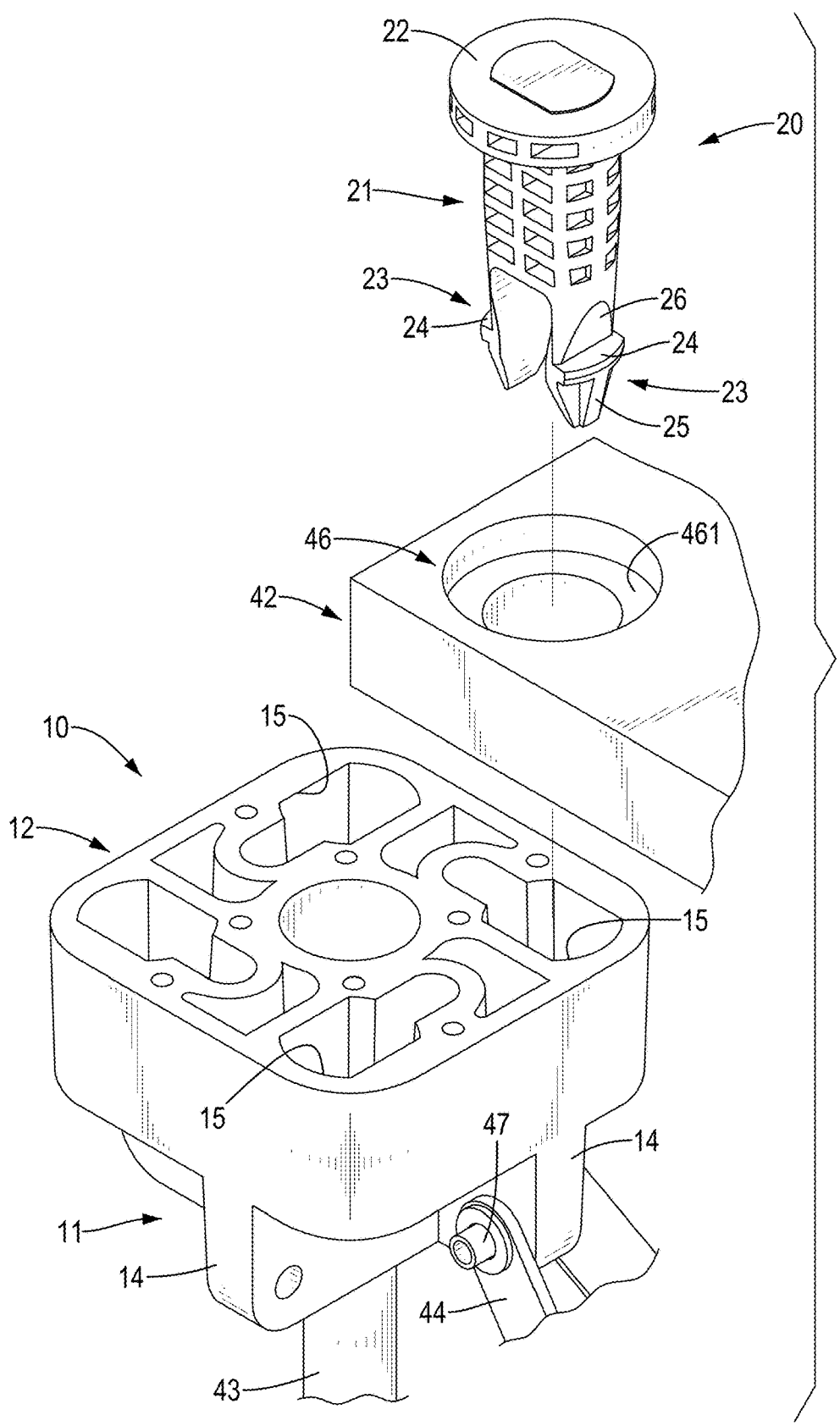
FIG. 5 is an exploded perspective view of the assembly device in FIG. 3.
Figure 6:
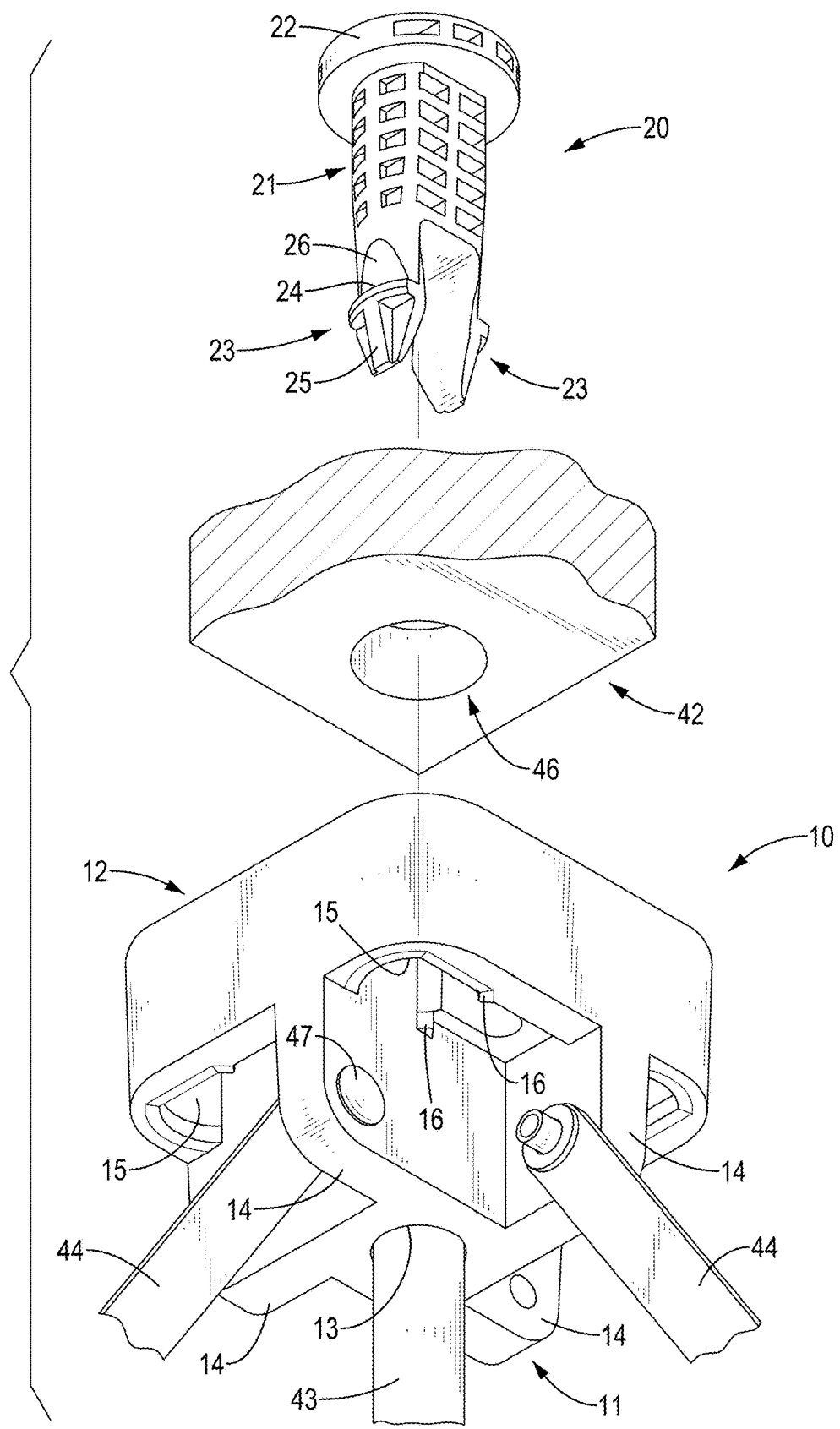
FIG. 6 is an exploded perspective view of the assembly device in FIG. 4.

With reference to FIGS. 5 and 6, the table board 42 is provided with the assembling holes 46 in the same number as the assembly device of the present invention. Preferably, each one of the assembling holes 46 is formed through a top side and a bottom side of the table board 42 and has a stepped face formed in an inner side of the assembling hole 46. Furthermore, the table 40 is a workbench that can be easily folded and carried. Additionally, the assembly device for a table of the present invention can be applied between a table board and a mounting frame of various forms of tables, and is not limited to the above-mentioned type of table.

With reference to FIGS. 3 to 6, the assembly device is connected to the mounting frame 41 and the table board 42 of the table 40 and has an assembling mount 10 and at least one engaging element 20.

The assembling mount 10 has a connecting portion 11 and an engaging portion 12. The connecting portion 11 is disposed at a lower part of the assembling mount 10 and has a leg hole 13 and at least one connecting panel 14. The leg hole 13 is formed in a bottom of the connecting portion 11 and is connected to one of the supporting legs 43 of the mounting frame 41. The at least one connecting panel 14 is disposed at a side of the leg hole 13 and is pivotally connected to one of the connecting shafts 44 of the mounting frame 41. Furthermore, the connecting portion 11 has multiple connecting panels 14 arranged around an outer periphery of the leg hole 13. Preferably, with reference to FIGS. 4 and 6, the connecting portion 11 has four said connecting panels extended in four different directions, respectively. With reference to FIGS. 1 and 2, the four said connecting panels 14 are pivotally connected to the multiple connecting shafts 44 of the mounting frame 41. Furthermore, each connecting panel 14 is pivotally connected to the corresponding connecting shaft 44 by riveting with a rivet 47. In addition, the pivotal connection is not limited to the type of rivet 47, as long as each connecting shaft 44 can be pivotally connected to the corresponding connecting panel 14.

With reference to FIGS. 3 to 6, the engaging portion 12 is disposed at an upper part of the assembling mount 10, is connected to the connecting portion 11, and has at least one engaging hole 15. The at least one engaging hole 15 is formed through a top side and a bottom side of the engaging portion 12 and aligns with one of the assembling holes 46 of the table board 42. Furthermore, with reference to FIGS. 4 and 6, the engaging portion 12 has at least one limiting protrusion 16 formed on and protruded from the bottom side of the engaging portion 12 and disposed at an outer periphery of the at least one engaging hole 15. Preferably, the engaging portion 12 has two said limiting protrusions 16 formed on the bottom side of the engaging portion 12 at the outer periphery of the at least one engaging hole 15. Additionally, the two said limiting protrusions 16 are disposed at a spaced interval and are respectively disposed at two sides of the at least one engaging hole 15. Furthermore, each one of the at least one engaging hole 15 has an extension direction of length being the same as an extension direction of length of the at least one connecting panel 14. Preferably, the engaging portion 12 is provided with the engaging holes 15 in the same number as the connecting panels 14, and each one of the engaging holes 15 is located between two adjacent connecting panels 14.

Figure 7:
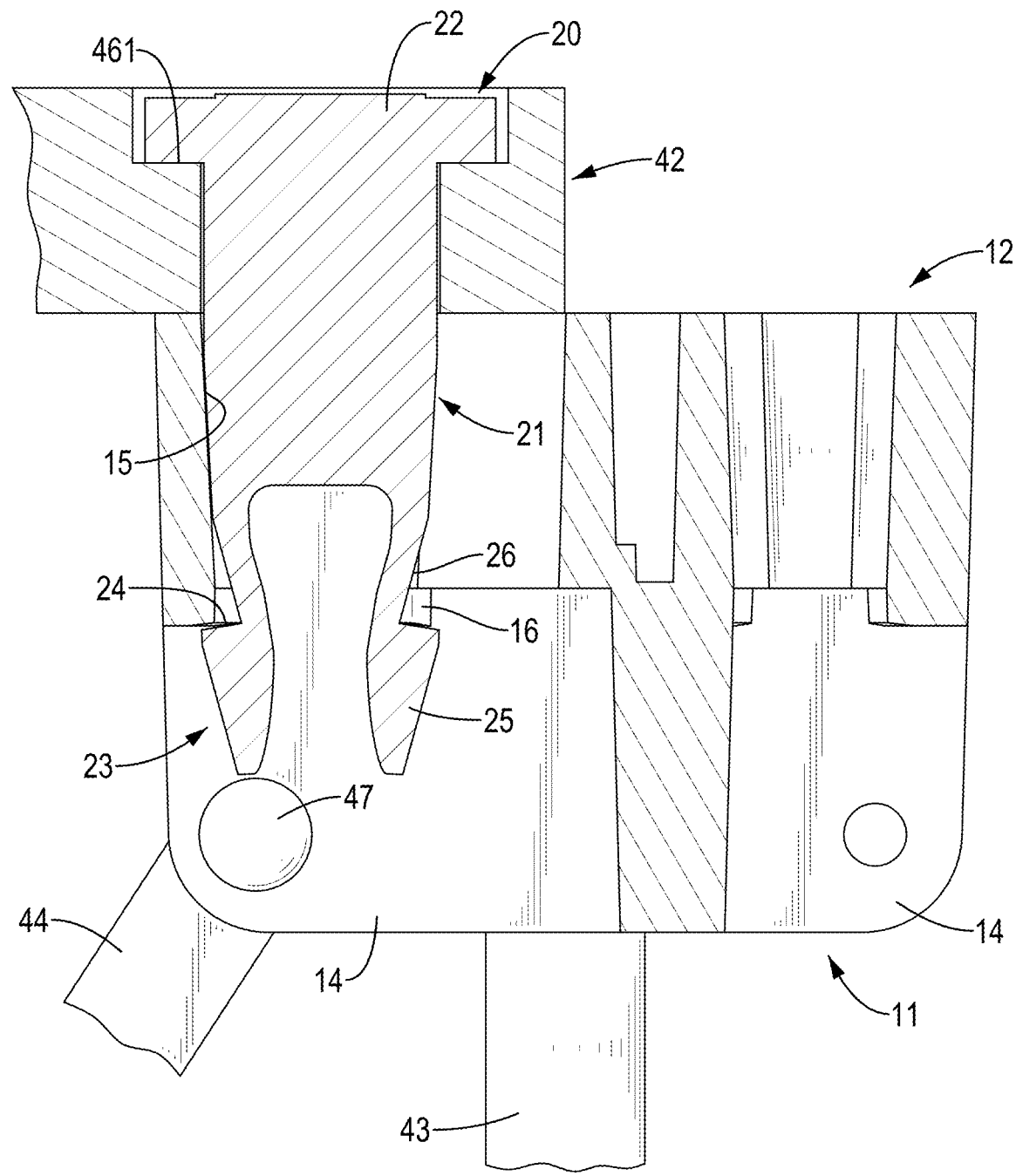
FIG. 7 is a cross-sectional side view of the assembly device in FIG. 3.

With reference to FIGS. 5, 6, and 7, the at least one engaging element 20 is detachably connected to the assembling mount 10, is inserted in the at least one engaging hole 15 of the assembling mount 10 via one of the assembling holes 46 of the table board 42, and abuts against the bottom side of the engaging portion 12 to hold the table board 42 between the at least one engaging element and the assembling mount 10 and to dispose the table board 42 above the mounting frame 41 via the assembly device of the present invention. Each one of the at least one engaging element 20 has an elastic engaging segment 21 and a head segment 22. The elastic engaging segment 21 is disposed at a bottom end of the at least one engaging element 20 and selectively abuts against the bottom side of the engaging portion 12 of the assembling mount 10 to hold the at least one engaging element 20 with the assembling mount 10.

Furthermore, the elastic engaging segment 21 has two engaging ribs 23 disposed at a spaced interval, and the two engaging ribs 23 can be deformed by an external force to move close to each other, so that the elastic engaging segment 21 deformably extends into the at least one engaging hole 15, and abuts against the bottom side of the engaging portion 12 after extending out of the at least one engaging hole 15. Additionally, each one of the two engaging ribs 23 has an abutting protrusion 24 disposed on an outer side of the engaging rib 23. When each one of the engaging ribs 23 extends out of the bottom side of the engaging portion 12, the abutting protrusion 24 of each engaging rib 23 abuts against the bottom side of the engaging portion 12. Preferably, the abutting protrusion 24 of one of the two engaging ribs 23 abuts against the two limiting protrusions 16 of the engaging portion 12 to enable the elastic engaging segment 21 of the at least one engaging element 20 stably abutting the engaging portion 12 of the assembling mount 10.

Figure 8:
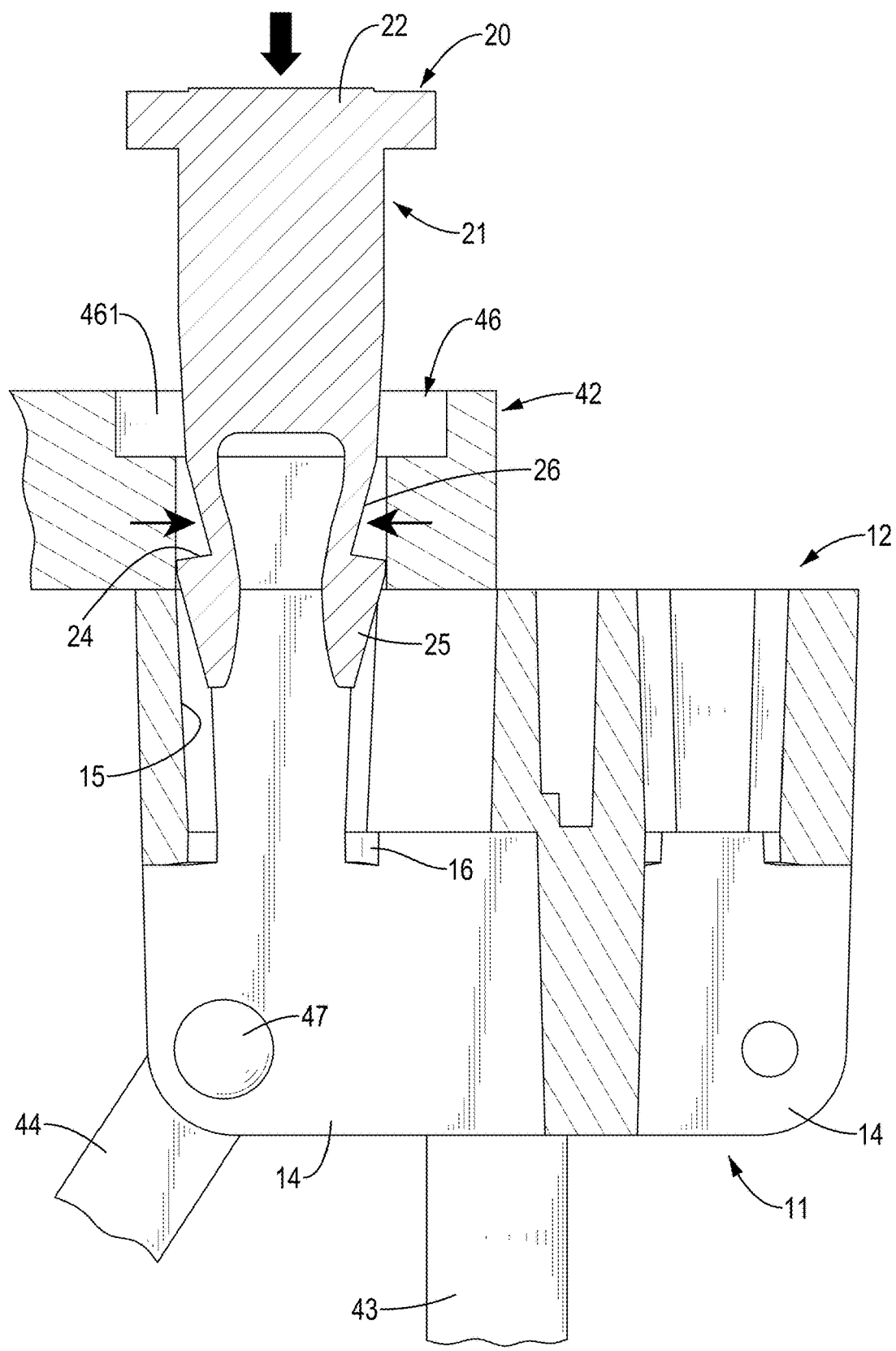
FIG. 8 is an operational and cross-sectional side view of the assembly device in FIG. 3, during assembly.

With reference to FIGS. 5, 6, and 7, the elastic engaging segment 21 has a guide block 25 obliquely disposed below each one of the two abutting protrusions 24. With reference to FIG. 8, when each one of the two engaging ribs 23 extends through the at least one engaging hole 15, the guide block 25 at each engaging rib 23 abuts an inner side of the at least one engaging hole 15 to enable the two engaging ribs 23 to deform and to move toward each other. With reference to FIG. 7, when the two engaging ribs 23 extend out of the bottom side of the engaging portion 12, the two engaging ribs 23 are moved away from each other to the original position, and this enables one of the two abutting protrusions 24 to abut against the two limiting protrusions 16 of the engaging portion 12.

In addition, the elastic engaging segment 21 has an inclined face 26 formed on each one of the two engaging ribs 23 above the abutting protrusion 24 to increase an elastic deformation range of the corresponding engaging rib 23. The head segment 22 is disposed on an end of the elastic engaging segment 21 away from the two engaging ribs 23 and is connected to the elastic engaging segment 21. When the elastic engaging segment 21 abuts against the engaging portion 12, the head segment 22 is mounted in the corresponding assembling hole 46 of the table board 42 and abuts against the stepped face 461. Preferably, the assembly device of the present invention is provided with the engaging elements 20 in the same number as the engaging holes 15, so that each one of the engaging elements 20 engages with one of the engaging holes 15 of the assembly device 10. Then multiple table boards 42 can be connected with each other by the multiple engaging elements 20 and the multiple engaging holes 15 to provide a splicing effect of multiple table boards 42.

With reference to FIGS. 5 and 6, when assembling the table 40, the assembling mount 10 of the assembly device of the present invention is moved below the table board 42 to align the at least one engaging hole 15 with one of the assembling holes 46 of the table board 42. Then the at least one engaging element 20 is inserted into the corresponding assembling hole 46 from the top side of the table board 42. At this time, with reference to FIG. 8, the two guide blocks 25 of the elastic engaging segment 21 abut the inner side of the at least one engaging hole 15 to enable the two engaging ribs 23 to deform and to move toward each other. With reference to FIG. 7, when the bottom end of the at least one engaging element 20 extends out of the bottom side of the engaging portion 12, the two engaging ribs 23 pressed by the inner side of the at least one engaging hole 15 are deformed to move back to the original position, the abutting protrusion 24 of one of the two engaging ribs 23 abuts against the two limiting protrusions 26, and the abutting protrusion of the other one of the two engaging ribs 23 abuts against the bottom side of the engaging portion 12. At the same time, the head segment 22 of the at least one engaging element 20 abuts against the stepped face 461 of the corresponding assembling hole 46. Then the table board 42 can be stably disposed between the assembling mount 10 and the at least one engaging element 20, and can be disposed on the mounting frame 41 via the assembly device of the present invention easily and conveniently.

Figure 9:
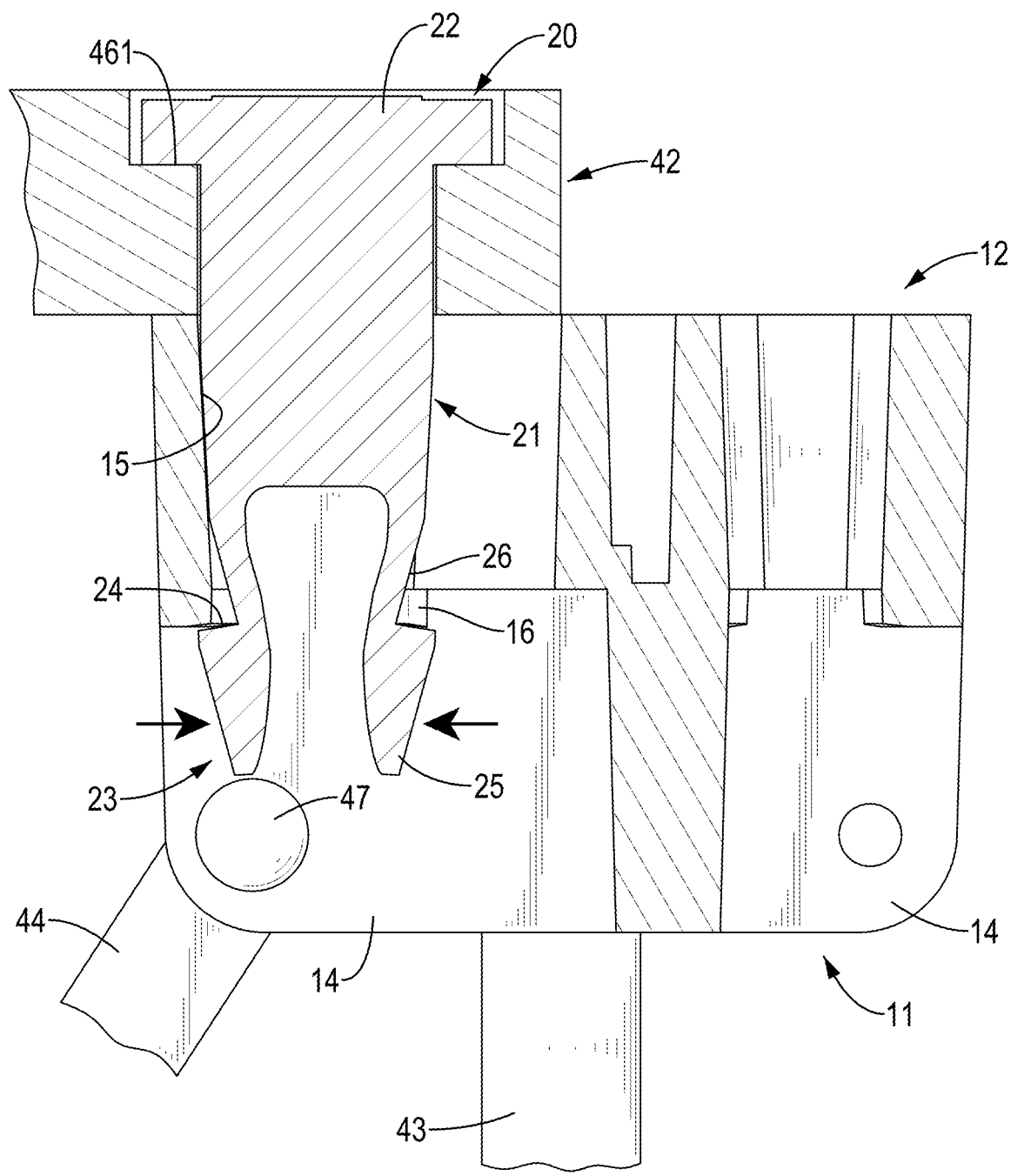
FIGS. 9 and 10 are operational and cross-sectional side views of the assembly device in FIG. 3, during disassembly.
Figure 10:
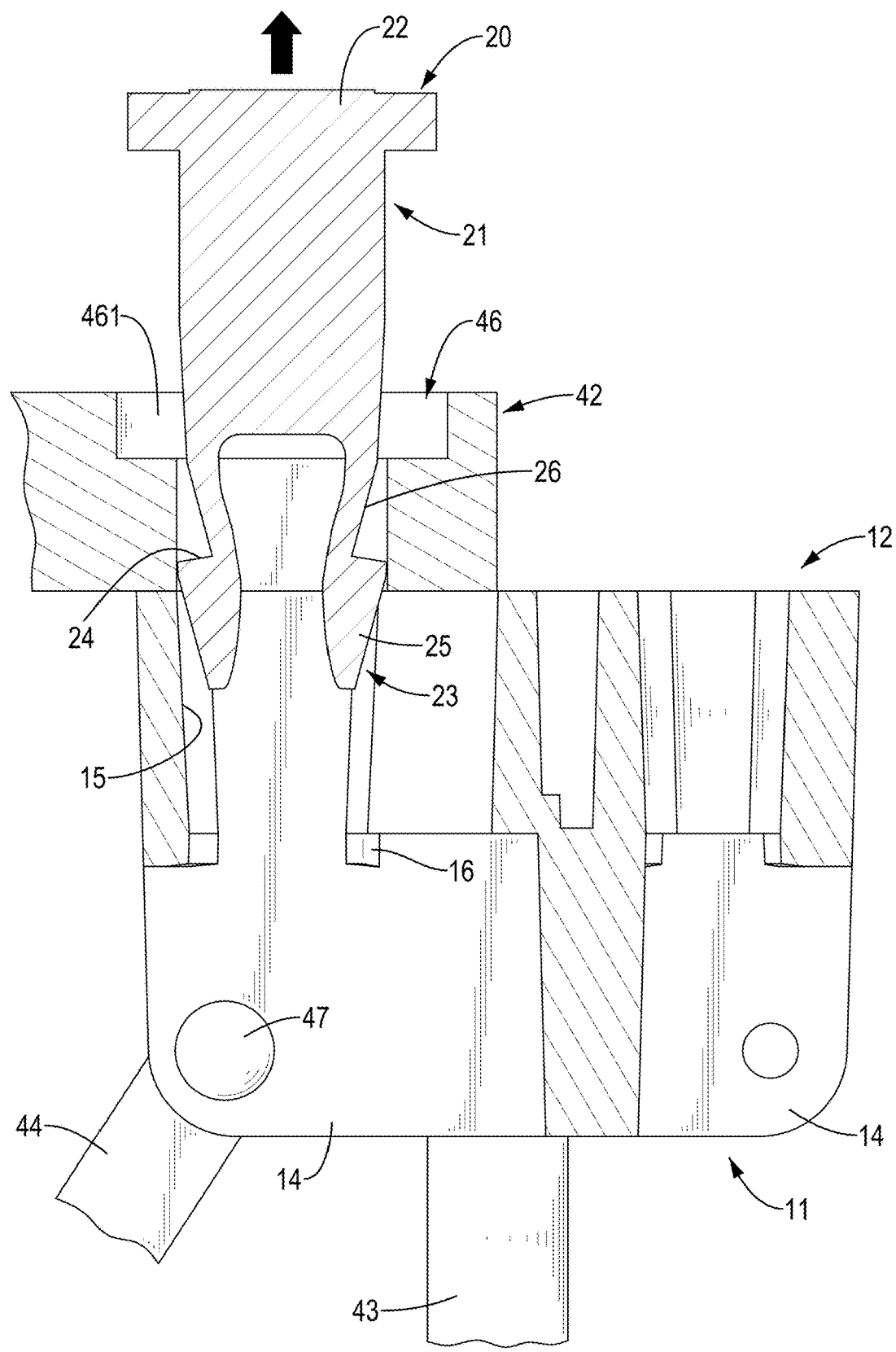
Figure 11:
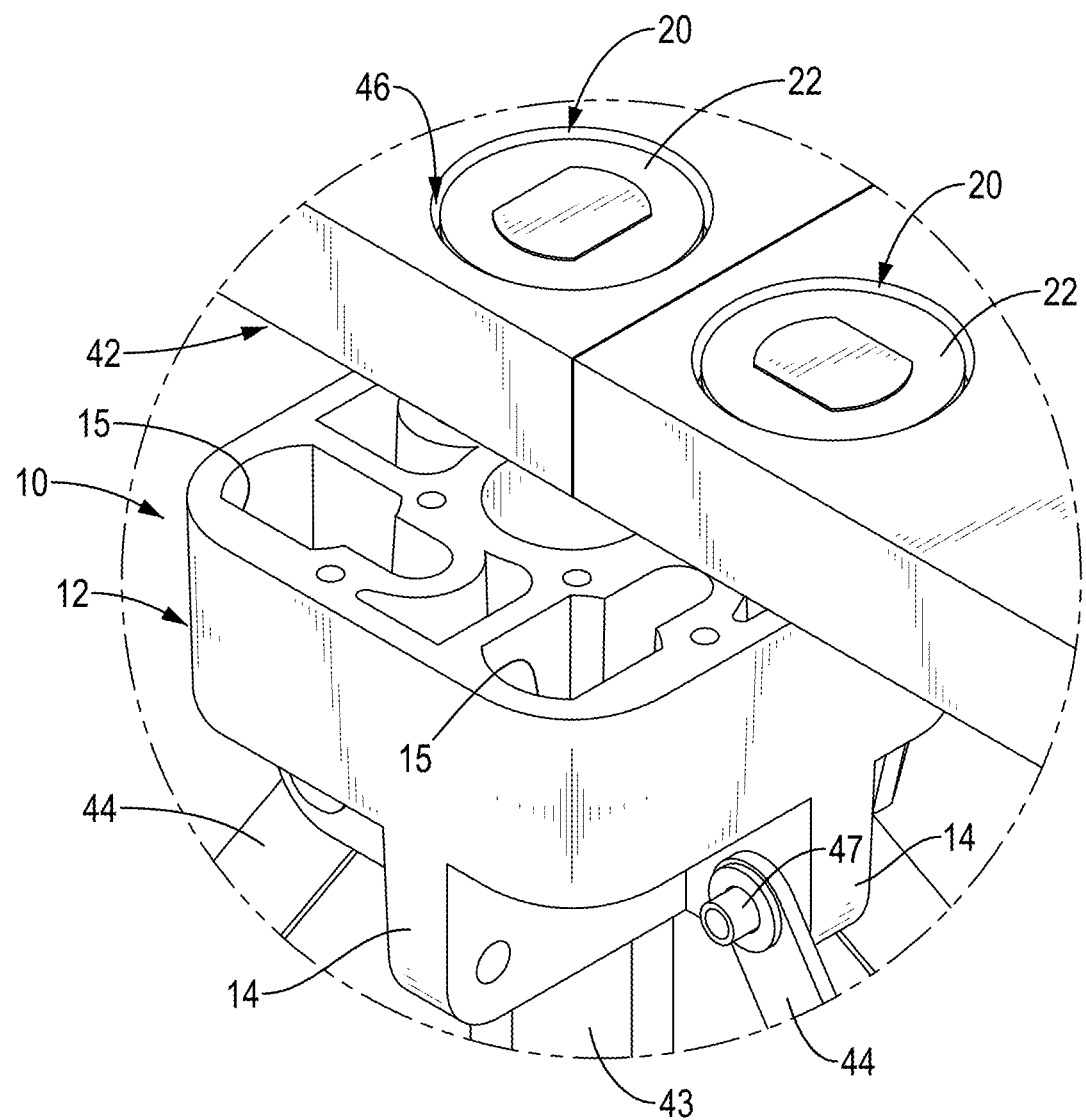
FIG. 11 is an enlarged perspective view of the assembly device at encircled B in FIG. 1.
Figure 12:
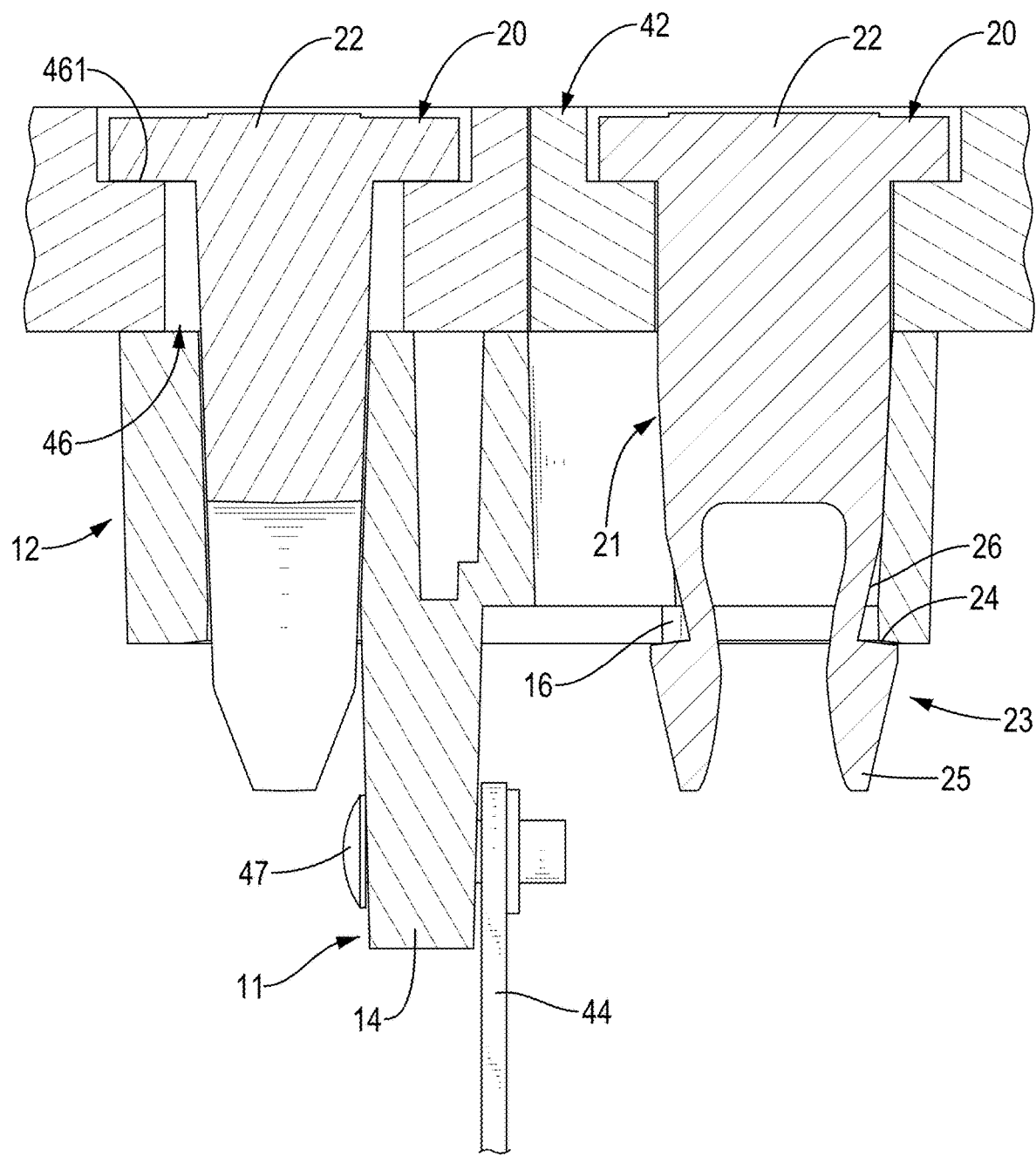
FIG. 12 is a cross-sectional side view of the assembly device in FIG. 11.

With reference to FIGS. 9 and 10, when the table 40 needs to be stored or carried after use, the user only needs to press the two engaging ribs 23 of the at least engaging element 20 to move toward each other and to separate from the two limiting protrusions 16 and the bottom side of the engaging portion 12, and pushes the at least one engaging element 20 to move upwardly relative to the assembling mount 10. Then the at least one engaging element 20 can be separated from the assembling mount 10 and the table board 42 conveniently and quickly. With reference to FIGS. 11 and 12, when the user wants to assemble multiple table boards 42, since the engaging portion 12 of the assembling mount has multiple said engaging holes 15, two of the multiple said engaging holes respectively align with two assembling holes 46 of two adjacent table boards 42, and two said engaging elements 20 are respectively inserted into the two engaging holes 15 of the assembling mount 10 via the two corresponding assembling holes 46 of the two adjacent table boards 42. Then the user can flexibly and conveniently assemble different numbers of table boards 42 according to needs to expand the usable area.

According to the above-mentioned structural relationships and features of the assembly device for a table of the present invention, the assembling mount can be assembled with multiple table boards 42 by the engaging holes 15 and the engaging elements 20, and this is different from the assembly device of the conventional table, since the assembling mount of the conventional table only has a single eccentric portion and can only be assembled with a single table board. Therefore, the assembly device for a table of the present invention can improve the practicality and flexibility in use without forming the eccentric portion on the external surface of the assembling mount 10, and this can also reduce the volume and weight of the assembling mount 10 and allow the user to conveniently store and carry the assembly device of the present invention.

Furthermore, the assembly device of the present invention does not need to embed the engaging panel in the table 42, and this can reduce the cost of using the assembly device, can reduce the overall weight of the table 42, and can reduce the burden of storing and carrying the table 40. In addition, in the present invention, the at least one engaging element 20 can be elastically deformed to abut against the assembling mount 10 to assemble the table board 42 with the mounting frame 41, the two abutting protrusions 24 abut against the two limiting protrusions 16 and the bottom side of the engaging portion 12, and the head segment 12 of the at least one engaging element 20 abuts against the stepped face 461 of the corresponding assembling hole 46. Then the table board 42 can be held securely and stably between the assembling mount 10 and the at least one engaging element 20 to dispose on the mounting frame 41, and the disassembly of the at least one engaging element 20 will not be affected by the relative displacement or deflection between the table board 42 and the mounting frame 41, so the assembly or disassembly of the assembly device for a table 40 of the present invention can be carried out conveniently and quickly.

Even though numerous characteristics and advantages of the present invention have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended 10 claims are expressed.

What is claimed is:

1. An assembly device for a table, being configured to connect to a table, the table having a mounting frame and a table board, the table board having at least one assembling hole with a stepped face formed in an inner side of the at least one assembling hole, and the assembly device comprising:

an assembling mount having
  a connecting portion being configured to pivotally connect to the mounting frame; and
  an engaging portion connected to the connecting portion and having at least one engaging hole formed through a top side and a bottom side of the engaging portion and aligning with the at least one assembling hole of the table board; and at least one engaging element detachably connected to the assembling mount, inserted in the at least one engaging hole of the assembling mount via the at least assembling hole of the table board, abutted against the bottom side of the engaging portion to hold the table board between the at least one engaging element and the assembling mount, and each one of the at least one engaging element having an elastic engaging segment abutted against the bottom side of the engaging portion; and a head segment connected to the elastic engaging segment, mounted in the at least one assembling hole of the table board, and abutted against the stepped face of the at least one assembling hole when the elastic engaging segment abuts against the engaging portion.

2. The assembly device as claimed in claim 1, wherein the elastic engaging segment has two engaging ribs disposed at a spaced interval; and the two engaging ribs are deformed to move toward each other by an external force to enable the elastic engaging segment to abut against the engaging portion deformably.

3. The assembly device as claimed in claim 2, wherein the engaging portion has two limiting protrusions formed on the bottom side of the engaging portion at an outer periphery of the at least one engaging hole;

each one of the two engaging ribs has an abutting protrusion disposed on an outer side of the engaging rib; and the abutting portion of one of the two engaging ribs abuts against the two limiting protrusions of the engaging portion when the two engaging ribs extend out of the bottom side of the engaging portion.

4. The assembly device as claimed in claim 3, wherein the elastic engaging segment has a guide block obliquely disposed below each one of the two abutting protrusions of the engaging ribs; and the guide block of each one of the engaging rib abuts an inner side of the at least one engaging hole to enable the two engaging ribs to deform and to move toward each other when the two engaging ribs extend through the at least one engaging hole.

5. The assembly device as claimed in claim 4, wherein the elastic engaging segment has an inclined face formed on each one of the two engaging ribs above the abutting protrusion to increase an elastic deformation range of the corresponding engaging rib.

6. The assembly device for a table as claimed in claim 5, wherein the connecting portion of the assembling mount has a leg hole formed in a bottom of the connecting portion to connect to the mounting frame; and at least one connecting panel disposed at a side of the leg hole to pivotally connect to the mounting frame.

7. The assembly device as claimed in claim 6, wherein the connecting portion has multiple said connecting panels arranged around an outer periphery of the leg hole to pivotally connect the connecting portion with the mounting frame.

8. The assembly device as claimed in claim 7, wherein the engaging portion is provided with the engaging holes in same number as the connecting panels, and each one of the said engaging holes is located between two adjacent said connecting panels; and the assembly device is provided with the engaging elements in same number as the engaging holes, and each one of the engaging elements abuts against one of the engaging holes of the assembling mount.

9. The assembly device as claimed in claim 4, wherein the connecting portion of the assembling mount has a leg hole formed in a bottom of the connecting portion to connect to the mounting frame; and at least one connecting panel disposed at a side of the leg hole to pivotally connect to the mounting frame.

10. The assembly device as claimed in claim 9, wherein the connecting portion has multiple said connecting panels arranged around an outer periphery of the leg hole to pivotally connect the connecting portion with the mounting frame;

the engaging portion is provided with the engaging holes in same number as the connecting panels, and each one of the engaging holes is located between two adjacent said connecting panels; and the assembly device is provided with the engaging elements in same number as the engaging holes, and each one of the engaging elements abuts against one of the engaging holes of the assembling mount.

11. The assembly device as claimed in claim 3, wherein the elastic engaging segment has an inclined face formed on each one of the two engaging ribs above the abutting protrusion to increase an elastic deformation range of the corresponding engaging rib.

12. The assembly device as claimed in claim 11, wherein the connecting portion of the assembling mount has a leg hole formed in a bottom of the connecting portion to connect to the mounting frame; and at least one connecting panel disposed at a side of the leg hole to pivotally connect to the mounting frame.

13. The assembly device as claimed in claim 12, wherein the connecting portion has multiple said connecting panels arranged around an outer periphery of the leg hole to pivotally connect the connecting portion with the mounting frame.

14. The assembly device as claimed in claim 13, wherein the engaging portion is provided with the engaging holes in same number as the connecting panels, and each one of the engaging holes is located between two adjacent said connecting panels; and the assembly device is provided with the engaging elements in same number as the engaging holes, and each one of the engaging elements abuts against one of the engaging holes of the assembling mount.

15. The assembly device for as claimed in claim 3, wherein the connecting portion of the assembling mount has a leg hole formed in a bottom of the connecting portion to connect to the mounting frame; and at least one connecting panel disposed at a side of the leg hole to pivotally connect to the mounting frame.

16. The assembly device as claimed in claim 15, wherein the connecting portion has multiple connecting panels arranged around an outer periphery of the leg hole to pivotally connect the connecting portion with the mounting frame;

the engaging portion is provided with the engaging holes in same number as the connecting panels, and each one of the engaging holes is located between two adjacent said connecting panels; and the assembly device is provided with the engaging elements in same number as the engaging holes, and each one of the engaging elements abuts against one of the engaging holes of the assembling mount.

17. The assembly device as claimed in claim 2, wherein the connecting portion of the assembling mount has a leg hole formed in a bottom of the connecting portion to connect to the mounting frame; and at least one connecting panel disposed at a side of the leg hole to pivotally connect to the mounting frame.

18. The assembly device as claimed in claim 17, wherein the connecting portion has multiple said connecting panels arranged around an outer periphery of the leg hole to pivotally connect the connecting portion with the mounting frame;

the engaging portion is provided with the engaging holes in same number as the connecting panels, and each one of the engaging holes is located between two adjacent said connecting panels; and the assembly device is provided with the engaging elements in same number as the engaging holes, and each one of the engaging elements abuts against one of the engaging holes of the assembling mount.

19. The assembly device as claimed in claim 1, wherein the connecting portion of the assembling mount has a leg hole formed in a bottom of the connecting portion to connect to the mounting frame; and at least one connecting panel disposed at a side of the leg hole to pivotally connect to the mounting frame.

20. The assembly device as claimed in claim 19, wherein the connecting portion has multiple said connecting panels arranged around an outer periphery of the leg hole to pivotally connect the connecting portion with the mounting frame;

the engaging portion is provided with the engaging holes in same number as the connecting panels, and each one of the engaging holes is located between two adjacent said connecting panels; and the assembly device is provided with the engaging elements in same number as the engaging holes, and each one of the engaging elements abuts against one of the engaging holes of the assembling mount.

* * * * *